United States Patent
Chu

(10) Patent No.: US 8,589,820 B2
(45) Date of Patent: Nov. 19, 2013

(54) MOBILE TERMINAL AND METHOD FOR RETRIEVING PHONE NUMBER THEREIN

(75) Inventor: Se Youp Chu, Gumi-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 949 days.

(21) Appl. No.: 12/231,014

(22) Filed: Aug. 28, 2008

(65) Prior Publication Data
US 2009/0064043 A1 Mar. 5, 2009

(30) Foreign Application Priority Data

Aug. 31, 2007 (KR) .................. 10-2007-0088586

(51) Int. Cl.
*G06F 3/048* (2013.01)

(52) U.S. Cl.
USPC ........................................... 715/816

(58) Field of Classification Search
USPC ........................................... 715/816
See application file for complete search history.

(56) References Cited

U.S. PATENT DOCUMENTS

| | | | |
|---|---|---|---|
| 6,557,004 B1* | 4/2003 | Ben-Shachar et al. | 707/706 |
| 2004/0210844 A1* | 10/2004 | Pettinati et al. | 715/708 |
| 2006/0070011 A1* | 3/2006 | Matsuhara et al. | 715/816 |
| 2007/0027852 A1* | 2/2007 | Howard et al. | 707/3 |
| 2008/0250352 A1* | 10/2008 | Zaliva | 715/816 |

* cited by examiner

*Primary Examiner* — Sara England
*Assistant Examiner* — Angie Badawi

(57) ABSTRACT

A mobile terminal and a method for retrieving a phone number using identification names corresponding to stored phone numbers are provided. The method includes: displaying a first letter of identification names in a phone number retrieval mode, wherein each identification name corresponds to a phone number stored in the mobile terminal; selecting one of the displayed first letters; extracting at least one search keyword having the selected first letter as the first letter of the search keyword; and displaying the identification names corresponding to the search keyword. Retrieval of a phone number is thereby simplified, and the retrieval speed of the phone number is improved.

20 Claims, 4 Drawing Sheets

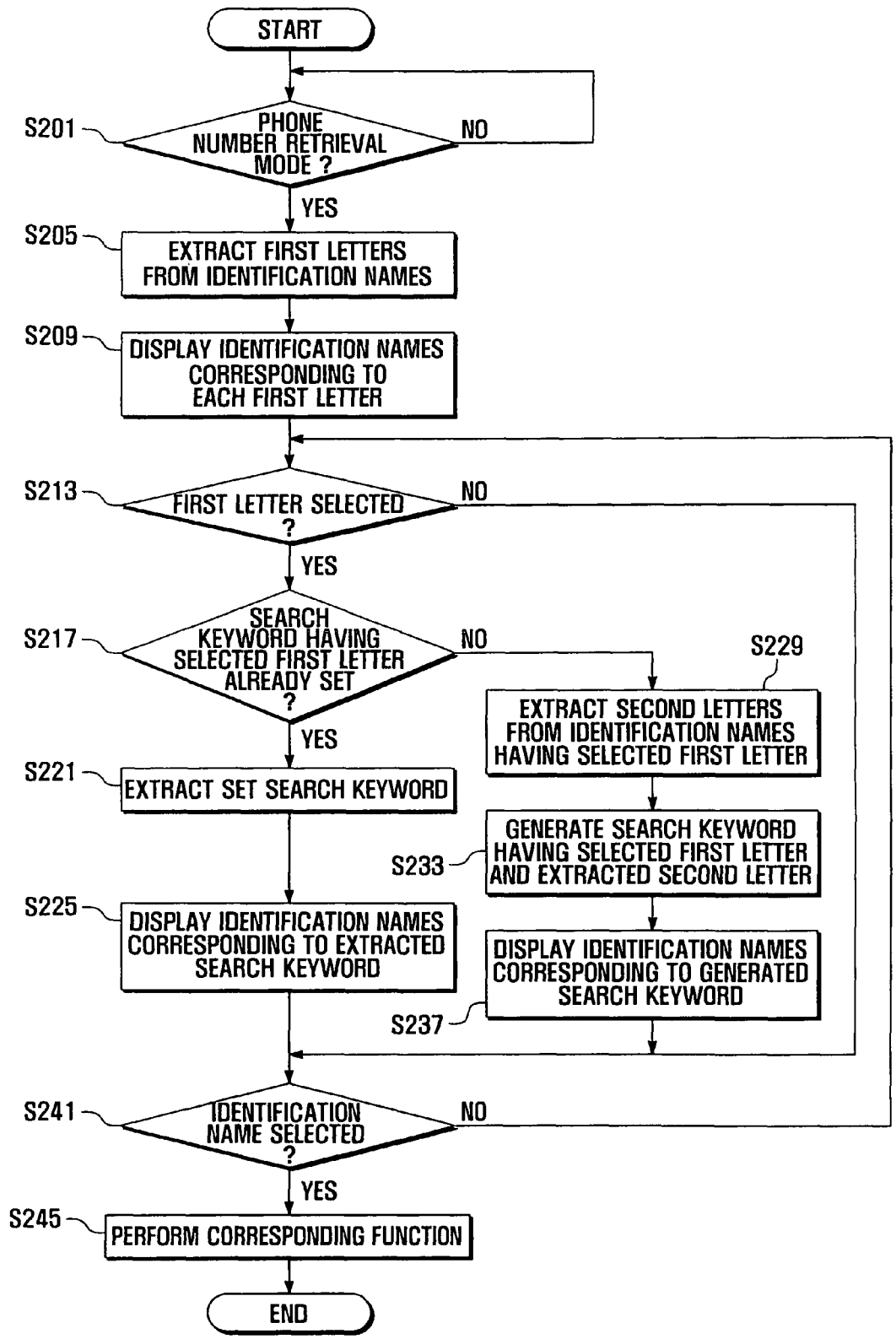

MOBILE TERMINAL AND METHOD FOR RETRIEVING PHONE NUMBER THEREIN

CROSS-REFERENCE TO RELATED APPLICATION(S) AND CLAIM OF PRIORITY

The present application claims priority to an application entitled "MOBILE TERMINAL AND METHOD FOR RETRIEVING PHONE NUMBER THEREIN" filed in the Korean Intellectual Property Office on Aug. 31, 2007 and assigned Serial No. 2007-0088586, the contents of which are incorporated herein by reference.

TECHNICAL FIELD OF THE INVENTION

The present invention relates to a mobile terminal and a method for retrieving a phone number in a contact list therein and, more particularly, to a mobile terminal and a method for retrieving a phone number using identification names corresponding to stored phone numbers.

BACKGROUND OF THE INVENTION

The number of users relying on a mobile terminal has increased with technical developments in the mobile terminal, and thus, a variety of information is nowadays stored in the mobile phone. In particular, phone numbers are mapped to corresponding identification names for storage in the mobile terminal. When retrieving a stored phone number, an identification name corresponding to the stored phone number is retrieved.

However, in the case of retrieving phone numbers in the mobile terminal, the stored identification names or phone numbers are displayed as a list. Thus, a user should perform a key input for scrolling the list so as to retrieve a desired phone number. Alternatively, an identification name created by a user may be used as a search keyword when retrieving a phone number in the mobile terminal. Thus, the user should perform a key input for inputting the identification name as the search keyword to retrieve the desired phone number. Accordingly, the number of keys required to be input for retrieving the phone number in the mobile terminal is increased, thereby causing inconvenience.

SUMMARY OF THE INVENTION

To address the above-discussed deficiencies of the prior art, it is a primary object to provide a mobile terminal and a method for retrieving an identification name corresponding to a phone number to retrieve the phone number easily.

In an exemplary embodiment of the present invention, a method for retrieving a phone number stored in a mobile terminal includes: displaying a first letter of identification names in a phone number retrieval mode, wherein each identification name corresponds to a phone number stored in the mobile terminal; selecting one of the displayed first letters; extracting at least one search keyword having the selected first letter as the first letter of the search keyword; and displaying the identification names corresponding to the search keyword.

In another exemplary embodiment of the present invention, a mobile terminal includes: a memory unit for storing phone numbers and identification names corresponding to the phone numbers; a display unit for displaying a first letter of the stored identification names in a phone number retrieval mode; an input unit for selecting a displayed first letter; and a controller for extracting at least one search keyword having the selected first letter as the first letter of the search keyword, and displaying the identification names corresponding to the search keywords.

According to the present invention, the speed of retrieving a phone number may be improved by subdividing a search keyword used to retrieve the phone number.

Further, the search keyword used to retrieve the phone number may be previously set and subdivided, thereby reducing the number of search keywords to be selected by a user.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a flowchart illustrating a method for retrieving a phone number in a mobile terminal according to another exemplary embodiment of the present invention.

DETAILED DESCRIPTION OF THE INVENTION

FIGS. 1 through 3C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

A mobile terminal according to an exemplary embodiment of the present invention may be a mobile communication terminal, a mobile phone, a personal digital assistant (PDA) or a smart phone that includes a phone number storage unit for retrieving a phone number.

Figure 1:
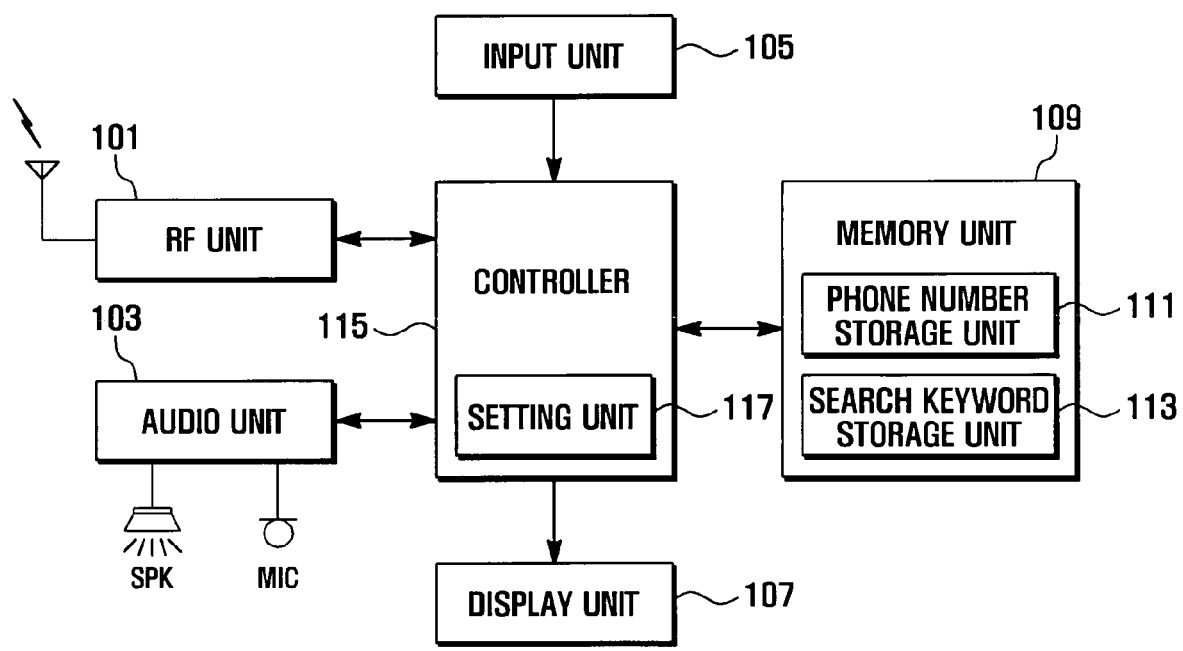
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring to FIG. 1, the mobile terminal includes a radio frequency (RF) unit 101, an audio unit 103, an input unit 105, a display unit 107, a memory unit 109 and a controller 115. The memory unit 109 includes a phone number storage unit 111 and a search keyword storage unit 113; and the controller 115 includes a setting unit 117.

The RF unit 101 performs wireless communication with a mobile communication network. For example, the RF unit 101 transmits and receives voice data and text messages through the mobile communication network.

The audio unit 103 converts an analog audio signal input through a microphone (MIC) into a digital audio signal and outputs the digital audio signal to the controller 115. The audio unit 103 converts the digital audio signal received from the RF unit 101 through the controller 115 into an analog audio signal and outputs the analog audio signal through a speaker (SPK).

The input unit 105 outputs a signal corresponding to a key input by a user to control operations of the mobile terminal to the controller 115. The input unit 105 may be provided with a key pad or another input means, such as a touch screen, a touch pad and a scroll wheel. The input unit 105 may include a key for retrieving an identification name.

The display unit 107 displays a series of operation of the mobile terminal, operation results and a variety of information under the control of the controller 115. The display unit 107 may be provided as a display apparatus such as a liquid crystal display (LCD) or an organic light emitting diode (OLED). If the display unit 107 is provided as a touch screen in the present embodiment, the touch screen executes functions of the input unit 105 and the display unit 107. Information is input through the touch screen by a user's hand or a stylus. The touch screen detects position information for a touch position input by the user and transmits the position information to the controller 115.

The memory unit 109 stores information on an operation of a program for controlling the mobile terminal and a program for retrieving phone numbers through identification names mapped to corresponding phone numbers under the control of the controller 115. The information may include a setting state and menu information.

The memory unit 109 includes the phone number storage unit 111 and the search keyword storage unit 113 for performing phone number retrieval. The phone number storage unit 111 stores identification names such as 'Jack', 'Jill', 'best friend,' etc., to correspond to the respective phone numbers. The identification names include at least one letter. The phone number storage unit 111 may include further information about the corresponding telephone contact (for example, a birthday and an e-mail address). The search keyword storage unit 113 stores a search keyword that is set by the setting unit 117. The search keyword is set in the form of a combination of at least two consecutive letters in the corresponding identification name. That is, the search keyword is set in the form of a combination of a first letter and an adjacent second letter. The first letter is the first letter in the identification name and the second letter is the second letter in the identification name. For example, the search keyword storage unit 113 may store 'Ja', 'Jac' or 'Jack' as the search keyword in the identification name 'Jack'.

The controller 115 controls an overall operation in the mobile terminal. The controller 115 includes a transmitter for encoding and modulating a signal to be transmitted from the RF unit 101 and a receiver for demodulating and decoding a received signal. The controller 115 includes a modem and a codec. Also, the controller 115 includes a setting unit 117 for setting a search keyword. The setting unit 117 generates and sets a search keyword that is a combination of the first and second letters in the corresponding identification name input by a user through the input unit 105. Then, the setting unit 117 controls the storage of the search keyword in the search keyword storage unit 113.

The controller 115 controls the display of a first letter of identification names in a phone number retrieval mode. When the user selects a first letter, the controller 115 determines whether a search keyword having the selected first letter is previously set. If a search keyword having the selected first letter is not previously set, the controller 115 extracts the second letter next to the first letter from the identification name having the selected first letter. If the number of the identification names having the selected first letter is greater than a predetermined threshold value, the controller 115 extracts the second letter. The controller 115 then combines the selected first letter and the extracted second letter to generate a search keyword.

For example, if the number of the identification names having a first letter 'A' is greater than a threshold value (for example, 30), the controller 115 may extract a second letter next to the 'A'. Alternatively, if the number of the identification names having the first letter 'A' is greater than a threshold value (for example, a number equal to 40% of the identification names stored in the phone number storage unit 111), the controller 115 may extract a second letter next to the 'A'.

If at least one search keyword having the selected first letter is previously set, the controller 115 extracts the set search keywords having the selected first letter. The controller 115 then controls the display of the identification names corresponding to the search keywords.

Figure 3A:
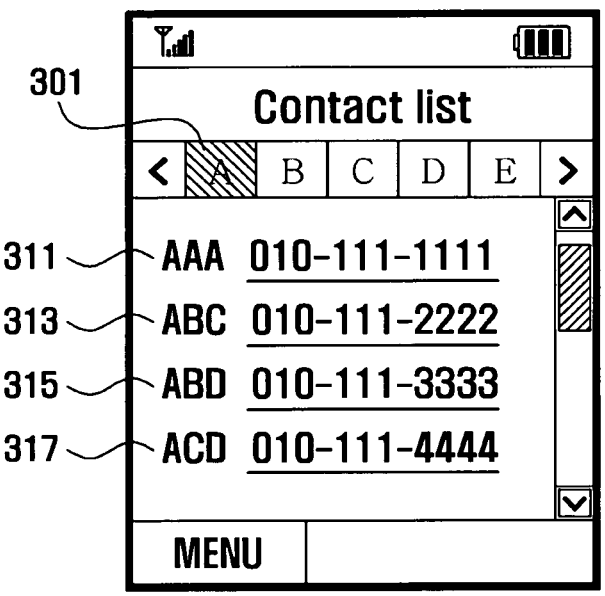
FIGS. 3A, 3B and 3C illustrate examples of a screen displayed when retrieving a phone number in the method of FIG. 2.
Figure 3B:
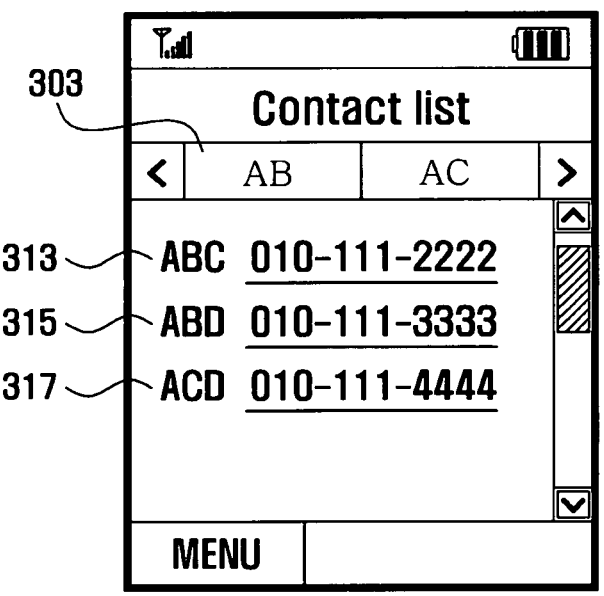
Figure 3C:
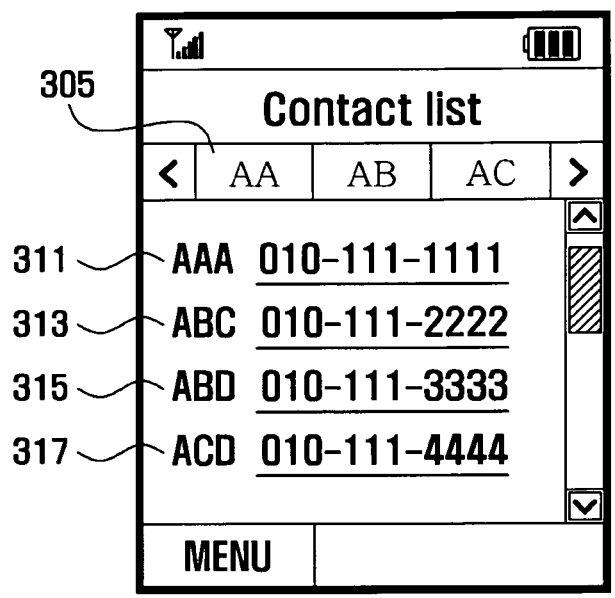

FIG. 2 is a flowchart illustrating a method for retrieving a phone number in a mobile terminal according to another exemplary embodiment of the present invention. FIGS. 3A, 3B and 3C illustrate examples of a screen displayed when retrieving a phone number in the method of FIG. 2.

Referring to FIG. 2, upon entering a phone number retrieval mode (S201), the controller 115 extracts first letters of all identification names stored in the phone number storage unit 111 (S205). For example, the controller 115 extracts the first letter 'A' from a stored identification name 'ABC'. The controller 115 then displays the identification names corresponding to each extracted first letter (S209). In the example shown in FIG. 3A, identification names 311, 313, 315 and 317 corresponding to a first letter 301 are displayed. Although not shown, the controller 115 may allocate pages according to each first letter and arrange the corresponding identification names therein. For example, pages may be allocated to the first letter 301, and the identification names 311, 313, 315 and 317 having the first letter 301 may be arranged in respective pages. Thereafter, the controller 115 may use separate pages to display the identification names 311, 313, 315 and 317 corresponding to the first letter 301.

Next, if the user selects a first letter (S213), the controller 115 determines whether a search keyword having the selected first letter is set (S217). The controller 115 determines whether a search keyword having the selected first letter is set by searching for the search keyword in the search keyword storage unit 113. For example, if the user selects the first letter 'A', the controller 115 determines whether a search keyword having the first letter 'A' is stored in the search keyword storage unit 113.

If the controller 115 determines that a search keyword having the selected first letter 301 is set at step S217, the controller 115 extracts the set search keyword (S221). The controller 115 then displays the identification names corresponding to the extracted search keyword on the display unit 107 (S225). In the example shown in FIG. 3B, the user selects first letter 301 'A' at step S213. The controller 115 then determines that 'AB' and 'AC' are set as search keywords having the first letter 301 'A' at step 217, and extracts 'AB' and 'AC' at step S221 and displays the identification names 313, 315 and 317 corresponding to the displayed keywords at step S225. Although not shown, the controller 115 may allocate pages according to the search keyword 303 and arrange the identification names 313, 315 and 317 having the search keyword 303 in the respective pages. Then, the controller 115 may use separate pages to display the identification names 313, 315 and 317 corresponding to the search keyword 303.

If the controller 115 determines that no search keyword having the selected first letter is set at step S217, the controller 115 extracts second letters from the identification names (311, 313, 315 and 317 in FIG. 3A) having the selected first letter (S229). For example, the controller 115 extracts the second letter 'B' from the identification name 313 'ABC'. Then, the controller 115 combines the selected first letter and the extracted second letter and generates a search keyword (S233). Thereafter, the controller 115 displays the identification names corresponding to the generated search keyword on the display unit 107 (S237), as shown in FIG. 3C. In the example shown in FIG. 3C, if the selected first letter 301 is 'A' and no search keyword having the first letter 'A' is set, the controller 115 extracts the second letters 'A', 'B' and 'C' from the identification names 311, 313, 315 and 317 having the first letter 'A'. The controller 115 then generates 'AA', 'AB' and 'AC' as the search keywords 305, and displays the corresponding identification names of the search keywords 305 'AA', 'AB' and 'AC'. Here, the controller 115 may allocate pages according to the search keyword 305 and arrange the identification names 311, 313, 315 and 317 having the search keyword 305 in the respective pages. Then, the controller 115 may use separate pages to display the identification names 311, 313, 315 and 317 corresponding to the search keyword 305.

In the present embodiment, the controller 115 determines that no search keyword having the selected first letter is set at step S217, the controller 115 extracts the second letter at step S229, but the present invention is not limited thereto. For example, if the controller 115 determines that no search keyword having the selected first letter 301 is set at step S217, the controller 115 may determine whether the number of the identification names 311, 313, 315 and 317 having the selected first letter 301 exceeds a threshold value. Then, if the controller 115 determines that the number of the identification names 311, 313, 315 and 317 exceeds the threshold value, the controller 115 may extract the second letter.

For example, if the threshold value is set at 30 identification names, and the number of the identification names having the selected first letter 301 'A' exceeds 30, the controller 115 may extract the second letter. Alternatively, if, for example, the threshold value is set at 40% of the number of the identification names stored in the phone number storage unit 111, and the number of identification names having the selected first letter 301 'A' exceeds the threshold value, the controller 115 may extract the second letter.

Finally, if the user selects a displayed identification name (S241), the controller 115 performs a corresponding function using a phone number corresponding to the selected identification name (S251). The function may be, for example, a text message transmission or a telephone call.

If the user does not select a displayed identification name at step S241, the controller 115 repeatedly performs steps S213 to S241 until the user selects a displayed identification name.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for retrieving a phone number stored in a mobile terminal, the method comprising:
    displaying a first letter of identification names in a phone number retrieval mode, wherein each identification name corresponds to a phone number stored in the mobile terminal;
    selecting one of the displayed first letters;
    extracting a second letter next to the selected first letter from the identification names having the selected first letter;
    extracting at least one search keyword consisting of the selected first letter as the first letter of the search keyword and the extracted second letter as the second letter of the search keyword; and
    displaying the at least one extracted search keyword and the identification names corresponding to the at least one extracted search keyword.

2. The method according to claim 1, wherein the second letter is extracted when the number of the identification names having the selected first letter is greater than a predetermined threshold value.

3. The method of claim 2, wherein the identification names are arranged in pages, each page having an identifier corresponding to one of the at least one extracted search keyword.

4. The method according to claim 1, further comprising setting, before extracting the at least one search keyword, a search keyword having the first letter of an identification name as its first letter and the second letter of the identification name as its second letter next to the first letter.

5. The method according to claim 4, wherein setting a search keyword is performed when a search keyword having the selected first letter is not already set.

6. The method according to claim 4, further comprising, extracting, after selecting a first letter, when a search keyword having the selected first letter is already set, the set search keyword.

7. The method of claim 1, wherein the identification names are arranged in pages, each page having an identifier corresponding to one of the at least one extracted search keyword.

8. A mobile terminal comprising:
    a memory unit configured to store phone numbers and identification names corresponding to the phone numbers;
    a display unit configured to display a first letter of the stored identification names in a phone number retrieval mode;
    an input unit configured to select a displayed first letter; and
    a controller configured to extract a second letter next to the selected first letter from the identification names having the selected first letter and to extract at least one search keyword consisting of the selected first letter as the first letter of the search keyword and the extracted second letter as the second letter of the search keyword, and display the at least one extracted search keyword and the identification names corresponding to the at least one extracted search keyword.

9. The mobile terminal according to claim 8, wherein the controller extracts the second letter when the number of the identification names having the selected first letter is greater than a predetermined threshold value.

10. The mobile terminal of claim 9, wherein the identification names are arranged in pages, each page having an identifier corresponding to one of the at least one extracted search keyword.

11. The mobile terminal according to claim 8, wherein the controller sets a search keyword when a search keyword having the selected first letter is not already set.

12. The mobile terminal according to claim 11, wherein, after selecting the first letter, when a search keyword having the selected first letter is already set, the controller extracts the set search keyword and displays the identification names corresponding to the search keyword.

13. The mobile terminal according to claim 12, wherein the controller comprises a setting unit for setting a search keyword having the first letter of an identification name as its first letter and the second letter of the identification name as its second letter next to the first letter.

14. The mobile terminal according to claim 13, wherein the memory unit comprises a search keyword storage unit for storing the set search keyword.

15. The mobile terminal of claim 8, wherein the identification names are arranged in pages, each page having an identifier corresponding to one of the at least one extracted search keyword.

16. A method for retrieving a phone number stored in a mobile terminal, the method comprising:
    extracting a first letter from a plurality of identification names;
    displaying the identification names corresponding to each extracted first letter;
    receiving a selection of a first letter;
    extracting, from a memory, a second letter next to the selected first letter from the identification names having the selected first letter;
    extracting, from the memory, a search keyword consisting of the selected first letter as the first letter of the search keyword and the extracted second letter as the second letter of the search keyword; and
    displaying the identification names which correspond to the search keyword.

17. The method according to claim 16, wherein the second letter is extracted when the number of the identification names having the selected first letter is greater than a predetermined threshold value.

18. The method according to claim 16, further comprising saving, to the memory, a search keyword having the first letter of an identification name as its first letter and the second letter of the identification name as its second letter next to the first letter.

19. The method according to claim 18, wherein saving a search keyword to the memory is performed when a search keyword having the selected first letter is not in the memory.

20. The method of claim 16, wherein the identification names are arranged in pages, each page having an identifier corresponding to one of the at least one extracted search keyword.

* * * * *